United States Patent
Wintz et al.

(10) Patent No.: US 10,730,674 B2
(45) Date of Patent: Aug. 4, 2020

(54) WIRE TIE WITH ADHESIVE

(71) Applicant: Bedford Industries, Inc., Worthington, MN (US)

(72) Inventors: Trevor Wintz, Round Lake, MN (US); Terry Langland, Worthington, MN (US); David Schiller, Sioux Falls, SD (US)

(73) Assignee: Bedford Industries, Inc., Worthington, MN (US)

( * ) Notice: Subject to any disclaimer, the term of this patent is extended or adjusted under 35 U.S.C. 154(b) by 50 days.

(21) Appl. No.: 15/623,850

(22) Filed: Jun. 15, 2017

(65) Prior Publication Data

US 2018/0022521 A1    Jan. 25, 2018

Related U.S. Application Data

(60) Provisional application No. 62/364,109, filed on Jul. 19, 2016.

(51) Int. Cl.

| B65D 63/10 | (2006.01) |
|---|---|
| B65D 63/04 | (2006.01) |
| B65D 63/12 | (2006.01) |
| B65D 63/18 | (2006.01) |
| F16B 47/00 | (2006.01) |

(52) U.S. Cl.
CPC ......... B65D 63/04 (2013.01); B65D 63/1009 (2013.01); B65D 63/12 (2013.01); B65D 63/18 (2013.01); F16B 47/003 (2013.01); B65D 2563/00 (2013.01)

(58) Field of Classification Search
CPC .............................. B65D 63/04; F16B 47/003
See application file for complete search history.

(56) References Cited

U.S. PATENT DOCUMENTS

| 331,357 | A | * | 12/1885 | Wineberger | ........... | B65D 33/20 |
|---|---|---|---|---|---|---|
| | | | | | | 383/89 |
| 416,771 | A | * | 12/1889 | Wilson | ............... | B65D 33/1675 |
| | | | | | | 24/30.5 P |
| 907,492 | A | | 12/1908 | Graser | | |

(Continued)

OTHER PUBLICATIONS

International Search Report and Written Opinion dated Sep. 5, 2017 for International Application No. PCT/US2017/037670.

*Primary Examiner* — Jason W San
(74) *Attorney, Agent, or Firm* — Mai-Tram D. Lauer; Westman, Champlin & Koehler, P.A.

(57) ABSTRACT

A tie article has a substantially elongated configuration having opposed first and second longitudinal edges. The tie article includes a base layer, a cover layer, a closure device, an adhesive and an extension. The base layer includes a central segment and two arm segments, each of the arm segments extending from opposing sides of the central segment. The cover layer overlaps the base layer. The closure device is sandwiched between the base layer and the cover layer so that the base layer and cover layer are bonded together around the closure device. The adhesive is disposed on the central segment of the base layer. The extension is of either or both of the base layer and cover layer and extends beyond at least one of the first and second longitudinal edges. A method is described for attaching a second item to a first item with a tie article.

20 Claims, 7 Drawing Sheets

(56) References Cited

U.S. PATENT DOCUMENTS

| | | | |
|---|---|---|---|
| 1,199,595 A * | 9/1916 | Noble | B65D 63/04 24/20 EE |
| 1,518,767 A * | 12/1924 | Anderson | B65D 63/04 24/20 EE |
| 1,793,328 A | 2/1931 | Bombard | |
| 2,017,704 A | 10/1935 | Rose | |
| 2,138,066 A | 11/1938 | Matchett | |
| 2,159,976 A | 5/1939 | Matchett | |
| 2,554,105 A * | 5/1951 | Heinle | G09F 3/04 24/16 PB |
| 2,973,597 A * | 3/1961 | Powell | G09F 3/04 24/30.5 R |
| 3,290,854 A | 12/1966 | Mcmurray | |
| 3,315,877 A | 4/1967 | Grevich | |
| 3,409,948 A * | 11/1968 | Goodwin | B65D 63/10 24/16 R |
| 3,412,926 A * | 11/1968 | Bostwick | B65D 33/30 229/938 |
| 3,426,393 A * | 2/1969 | Mead | B65D 63/10 24/30.5 T |
| 3,439,867 A | 4/1969 | Paxton | |
| 3,475,264 A * | 10/1969 | Donaldson | B29C 70/00 156/179 |
| 3,534,520 A | 10/1970 | Moran | |
| 3,545,668 A | 12/1970 | Hultberg | |
| 3,747,163 A * | 7/1973 | Serino | G09F 3/0352 24/16 PB |
| 3,825,039 A | 7/1974 | Crabb | |
| 3,857,139 A * | 12/1974 | Turner | B65D 63/10 229/87.09 |
| 3,882,573 A | 5/1975 | Thomas | |
| 3,890,190 A | 6/1975 | Eburn | |
| 3,895,989 A | 7/1975 | Lucas | |
| 3,909,979 A * | 10/1975 | Perez | A01G 5/00 24/30.5 T |
| 3,919,829 A | 11/1975 | Burford | |
| 4,229,924 A * | 10/1980 | Teachout, Sr. | F16B 2/08 24/16 R |
| 4,318,518 A * | 3/1982 | Davis | E21F 17/02 248/60 |
| 4,391,063 A * | 7/1983 | Gill, III | A63H 27/10 156/227 |
| 4,394,955 A | 7/1983 | Raines | |
| 4,407,082 A * | 10/1983 | Stehouwer | G09F 3/14 156/73.1 |
| 4,420,355 A | 12/1983 | Saur | |
| 4,490,960 A | 1/1985 | Klemesrud | |
| 4,541,146 A * | 9/1985 | Giannone | B65D 63/04 24/20 EE |
| 4,559,766 A | 12/1985 | Matsushita | |
| 4,559,977 A | 12/1985 | Dilley | |
| 4,586,412 A | 5/1986 | Johnson | |
| 4,621,732 A * | 11/1986 | Olson | B65D 63/10 206/343 |
| 4,655,264 A | 4/1987 | Dilley | |
| 4,660,351 A | 4/1987 | Saitoh | |
| 4,696,244 A | 9/1987 | Sampson | |
| 4,730,434 A | 3/1988 | Knudsen | |
| 4,818,120 A * | 4/1989 | Addiego | B65D 33/30 383/5 |
| 4,825,512 A * | 5/1989 | Tremper | B65D 63/04 24/20 EE |
| 4,896,402 A * | 1/1990 | Jansen | B21D 53/36 24/20 EE |
| 4,915,996 A * | 4/1990 | Curry | B65D 67/00 24/30.5 R |
| 5,005,264 A * | 4/1991 | Breen | B65D 33/1691 24/30.5 R |
| 5,027,465 A | 7/1991 | McKay | |
| 5,045,042 A | 9/1991 | Rutledge | |
| 5,121,682 A | 6/1992 | Parker | |
| 5,215,797 A * | 6/1993 | Larsen | B65D 33/1691 428/40.1 |
| 5,227,210 A | 7/1993 | Larsen | |
| 5,286,111 A | 2/1994 | Brembilla | |
| 5,302,222 A | 4/1994 | Larsen | |
| 5,303,571 A * | 4/1994 | Quinn | B21D 53/36 24/16 R |
| 5,328,436 A | 7/1994 | Larsen | |
| 5,340,629 A * | 8/1994 | Rodighiero | C09J 7/20 428/41.8 |
| 5,389,190 A | 2/1995 | Larsen | |
| 5,390,473 A | 2/1995 | Nelson | |
| 5,402,619 A | 4/1995 | Nelson | |
| 5,503,102 A * | 4/1996 | McDonnell | B42D 3/145 116/238 |
| 5,507,043 A * | 4/1996 | Howe | A41D 19/0034 2/159 |
| 5,581,850 A * | 12/1996 | Acker | F16L 3/23 24/16 PB |
| 5,586,353 A * | 12/1996 | Merser | A43D 11/10 12/113 |
| 5,732,495 A * | 3/1998 | Lowe | G09F 3/14 24/30.5 T |
| 5,832,568 A * | 11/1998 | Higuchi | B65D 33/1625 24/30.5 R |
| 5,878,520 A | 3/1999 | Milbrandt | |
| 5,916,108 A | 6/1999 | Drietz | |
| 5,941,641 A | 8/1999 | Kinigakis | |
| 6,372,068 B1 | 4/2002 | Kincel | |
| 6,453,967 B1 | 9/2002 | DiFabio | |
| 6,673,413 B1 | 1/2004 | Kincel | |
| 6,824,629 B2 | 11/2004 | DiFabio | |
| D505,064 S * | 5/2005 | Kampfer | D20/22 |
| D511,450 S * | 11/2005 | Seth | D20/22 |
| 7,011,879 B1 | 3/2006 | Contreras | |
| 7,464,442 B2 * | 12/2008 | Laporte | B65D 63/08 24/20 R |
| 7,794,810 B2 | 9/2010 | Kawada | |
| 7,856,754 B2 * | 12/2010 | Long | A01G 9/128 47/46 |
| D634,105 S * | 3/2011 | Cheshire | D2/925 |
| 8,691,382 B2 * | 4/2014 | Buselli | B65D 67/00 428/343 |
| 8,794,834 B2 | 8/2014 | Forman | |
| 9,403,610 B2 * | 8/2016 | O'Donnell | B65B 27/10 |
| 9,938,062 B1 * | 4/2018 | Scarlett | B65D 63/109 |
| 2003/0182766 A1 * | 10/2003 | Avinger | B65D 63/1027 24/16 PB |
| 2005/0278901 A1 * | 12/2005 | Huang | B65D 63/06 24/16 R |
| 2006/0251342 A1 | 11/2006 | Forman | |
| 2009/0031537 A1 * | 2/2009 | Muscarella | A41F 17/04 24/72.1 |
| 2009/0182256 A1 | 7/2009 | Lin | |
| 2010/0236030 A1 * | 9/2010 | Dyer | B65D 63/1063 24/16 PB |
| 2011/0146032 A1 * | 6/2011 | Hu | A61F 5/01 24/265 R |
| 2012/0180268 A1 * | 7/2012 | Chen | B65D 63/1018 24/16 R |
| 2012/0247346 A1 | 10/2012 | Hoffman | |
| 2013/0255037 A1 * | 10/2013 | Rouleau | H02G 3/30 24/16 R |
| 2014/0150214 A1 * | 6/2014 | Preston | B60P 7/0823 24/265 R |
| 2014/0217718 A1 * | 8/2014 | O'Donnell | B65B 27/10 283/81 |
| 2014/0312188 A1 * | 10/2014 | Crosby | F16B 47/003 248/205.3 |
| 2015/0266626 A1 | 9/2015 | Forman | |
| 2015/0320129 A1 * | 11/2015 | Carney | A41D 25/008 24/66.9 |
| 2015/0342273 A1 * | 12/2015 | English | A41D 17/005 36/1.5 |
| 2016/0137368 A1 * | 5/2016 | Buselli | B65D 67/00 156/221 |

(56) References Cited

U.S. PATENT DOCUMENTS

2017/0234461 A1\* 8/2017 Fairchild ................. F16L 3/14
                                                        248/60
2018/0009556 A1\* 1/2018 Milbrandt ............... B65B 13/02
2018/0099234 A1\* 4/2018 Hinkle ................... A63H 33/14

\* cited by examiner

WIRE TIE WITH ADHESIVE

CROSS-REFERENCE TO RELATED APPLICATION

This application claims the benefit of priority from U.S. Provisional Patent Application No. 62/364,109, filed Jul. 19, 2016, which is fully incorporated herein by reference.

BACKGROUND

One application for a tie or bundling article involves securing medical drapes and hoses that are used on a patient in surgery. Often in a surgical area, compressed air hoses, communication cables and other support hoses are present. Before surgery starts, the hoses and cables are typically secured to a medical drape arranged around the patient as to not fall to the floor or interfere with the surgical team's operations. Currently, this is accomplished with adhesive tapes and/or straps with hook-and-loop fasteners. For this use, a bundling or tie article desirably is adjustable to hold various numbers and sizes of hoses and cables. Typical bundle sizes range from about ⅛" diameter for a single intravenous hose to bundles including one or more of a robotic communication cable of 1" diameter with several smaller hoses varying from ⅛" to ½" diameter.

SUMMARY

In one aspect, a tie article has a substantially elongated configuration having opposed first and second longitudinal edges. The tie article includes a base layer, a cover layer, a closure device, an adhesive and an extension. The base layer includes a central segment and two arm segments, each of the arm segments extending from opposing sides of the central segment. The cover layer overlaps the base layer. The closure device is sandwiched between the base layer and the cover layer so that the base layer and cover layer are bonded together around the closure device. The adhesive is disposed on the central segment of the base layer. The extension is of either or both of the base layer and cover layer and extends beyond at least one of the first and second longitudinal edges.

In another aspect, a method for attaching a second item to a first item includes providing a tie article, pressing an adhesive of the tie article onto the first item to attach the tie article to the first item; and bending the two arm segments of the tie article around the second item. The tie article has a substantially elongated configuration having opposed first and second longitudinal edges. The tie article includes a base layer, a cover layer, a closure device, and an adhesive. The base layer includes a central segment and two arm segments, each of the arm segments extending from opposing sides of the central segment. The cover layer overlaps the base layer. The closure device is sandwiched between the base layer and the cover layer so that the base layer and cover layer are bonded together around the closure device. The adhesive is disposed on the central segment of the base layer.

In yet another aspect, a process for manufacturing a plurality of tie articles includes feeding a first web of a first material in a first direction; feeding a wire adjacent the first web in the first direction; feeding a second web of a second material in the first direction, wherein the first web and the second web encase the fed first wire; laminating the first web and the second web with the first wire therebetween to form a tie article web; applying adhesive to a portion of the tie article web; and partially cutting the tie article web to form a plurality of connected tie articles. Each tie article has a substantially elongated configuration having opposed first and second longitudinal edges. Each tie article includes a central segment and two arm segments, each of the arm segments extending from opposing sides of the central segment; an adhesive disposed on the central segment; and an extension of either or both of the first material and the second material that extends beyond at least one of the first and second longitudinal edges.

This disclosure, in its various combinations, either in apparatus or method form, may also be characterized by the following listing of items:

1. A tie article having a substantially elongated configuration having opposed first and second longitudinal edges, the tie article including:
    a base layer including a central segment and two arm segments, each of the arm segments extending from opposing sides of the central segment;
    a cover layer overlapping the base layer;
    a closure device sandwiched between the base layer and the cover layer so that the base layer and cover layer are bonded together around the closure device;
    an adhesive disposed on the central segment of the base layer; and
    an extension of either or both of the base layer and cover layer extends that beyond at least one of the first and second longitudinal edges.
2. The tie article of item 1 wherein the closure device includes a wire.
3. The tie article of any of items 1-2 wherein the extension is located at the central segment.
4. The tie article of any of items 1-3 wherein the extension is located proximate an end of one of the arm segments.
5. The tie article of any of items 1-4 wherein the extension includes an aperture.
6. The tie article of any of items 1-5 having a longitudinal center line, and wherein the tie article is substantially symmetrical about the longitudinal center line.
7. The tie article of any of items 1-6 having a longitudinal center line, and wherein the tie article is asymmetrical about the longitudinal center line.
8. The tie article of any of items 1-7 and further including a release liner positioned adjacent the adhesive.
9. The tie article of any of items 1-8, wherein the closure device exhibits dead-fold properties.
10. A method for attaching a second item to a first item, the method including: providing a tie article having a substantially elongated configuration having opposed first and
    second longitudinal edges, the tie article including:
    a base layer including a central segment and two arm segments, each of the arm segments extending from opposing sides of the central segment;
    a cover layer overlapping the base layer;
    a closure device sandwiched between the base layer and the cover layer so that the base layer and cover layer are bonded together around the closure device; and
    an adhesive disposed on the central segment of the base layer; pressing the adhesive onto the first item to attach the tie article to the first item; and bending the two arm segments around the second item.
11. The method of item 10 further including twisting the two arm segments together.
12. The method of any of items 10-11 wherein the tie article includes an extension of either or both of the base layer and cover layer that extends beyond at least one of the first and second longitudinal edges, the extension including an aperture, the method including inserting an end of the one of the arm segments through the aperture.

13. The method of item 12 further including bending the one of the arm segments after inserting the end through the aperture.

14. The method of any of items 10-13 and further including removing a release liner from the adhesive before pressing the adhesive onto the first item.

15. A process for manufacturing a plurality of tie articles, the process including:
    feeding a first web of a first material in a first direction;
    feeding a wire adjacent the first web in the first direction;
    feeding a second web of a second material in the first direction, wherein the first web and the second web encase the fed first wire;
    laminating the first web and the second web with the first wire therebetween to form a tie article web;
    applying adhesive to a portion of the tie article web; and
    partially cutting the tie article web to form a plurality of connected tie articles, each tie article having a substantially elongated configuration having opposed first and second longitudinal edges, the tie article including:
        a central segment and two arm segments, each of the arm segments extending from opposing sides of the central segment;
        the adhesive disposed on the central segment; and
        an extension of either or both of the first material and the second material that extends beyond at least one of the first and second longitudinal edges.

16. The process of item 15 further including extruding a polymer to form the second web.

17. The process of any of items 15-16 wherein laminating is accomplished by one or more nip rollers.

18. The process of any of items 15-17 further including printing on the first web.

19. The process of any of items 15-18, wherein partially cutting the tie article web includes cutting the wire between adjacent tie articles.

20. The process of any of items 15-19 wherein the tie article web includes a scrap portion between two adjacent tie articles, the process further including removing the scrap portion from the tie article web.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. It is contemplated that all descriptions are applicable to like and analogous structures throughout the several embodiments.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

The illustrated embodiments of exemplary tie articles show just a few variations accordingly to the present disclosure. It is contemplated that many other changes in form and configuration are possible that fall within the scope of the present descriptions.

Figure 1:
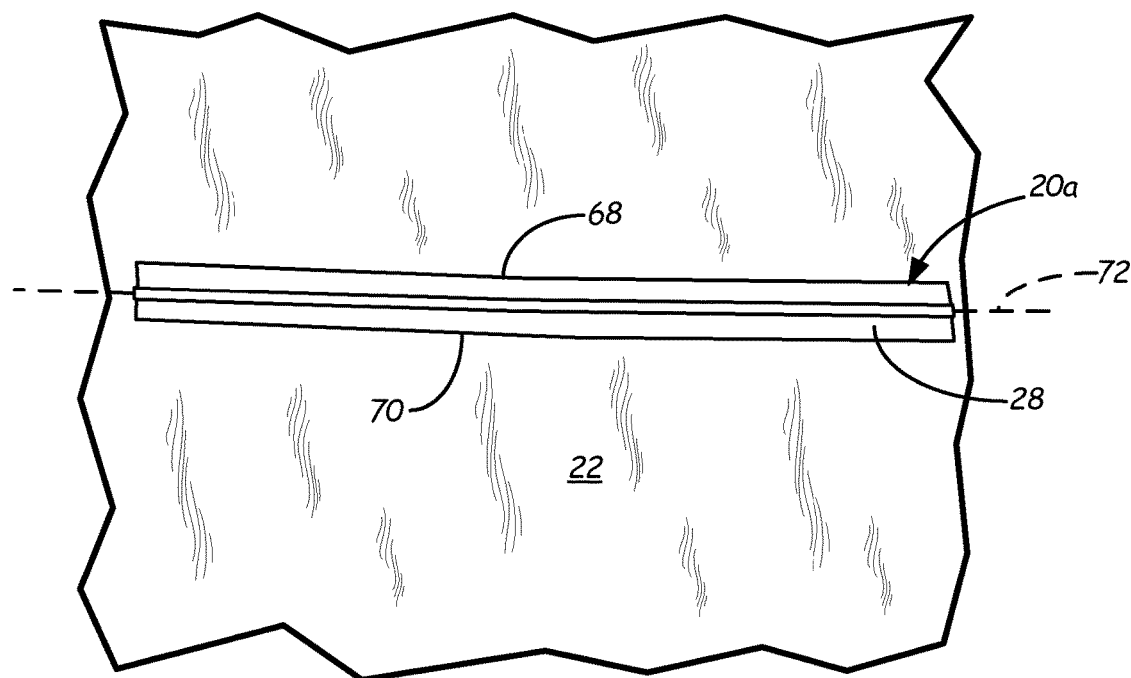
FIG. 1 is a top view of a first exemplary embodiment of a tie article of the present disclosure.
Figure 2:
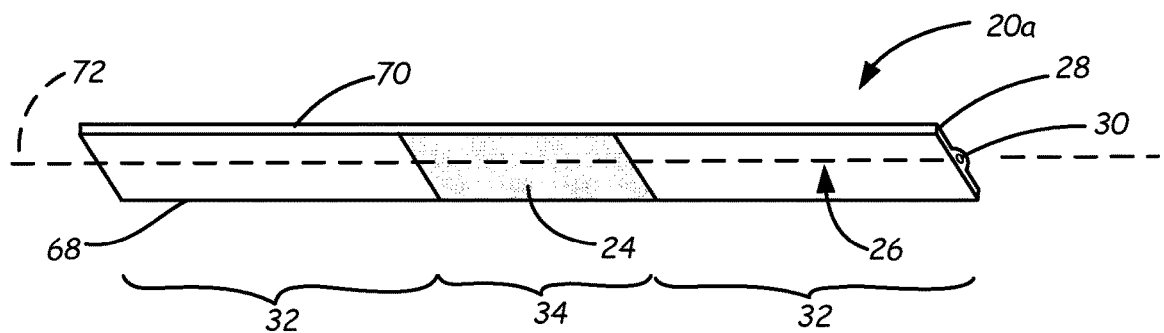
FIG. 2 is a perspective bottom view of the first exemplary tie article.
Figure 3:
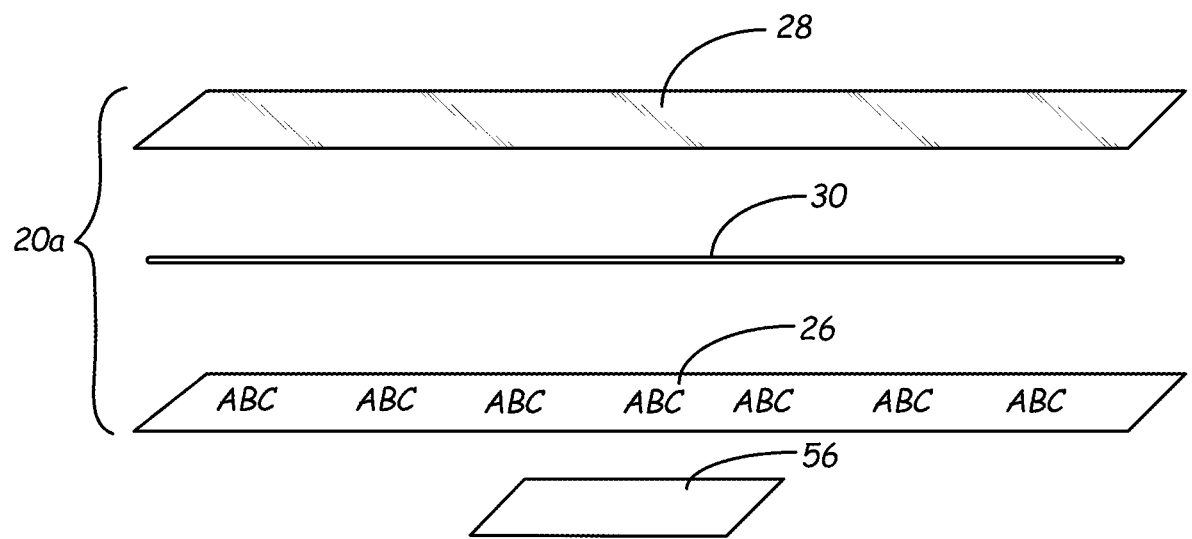
FIG. 3 is an exploded perspective view of the components of the first exemplary tie article.
Figure 4A:
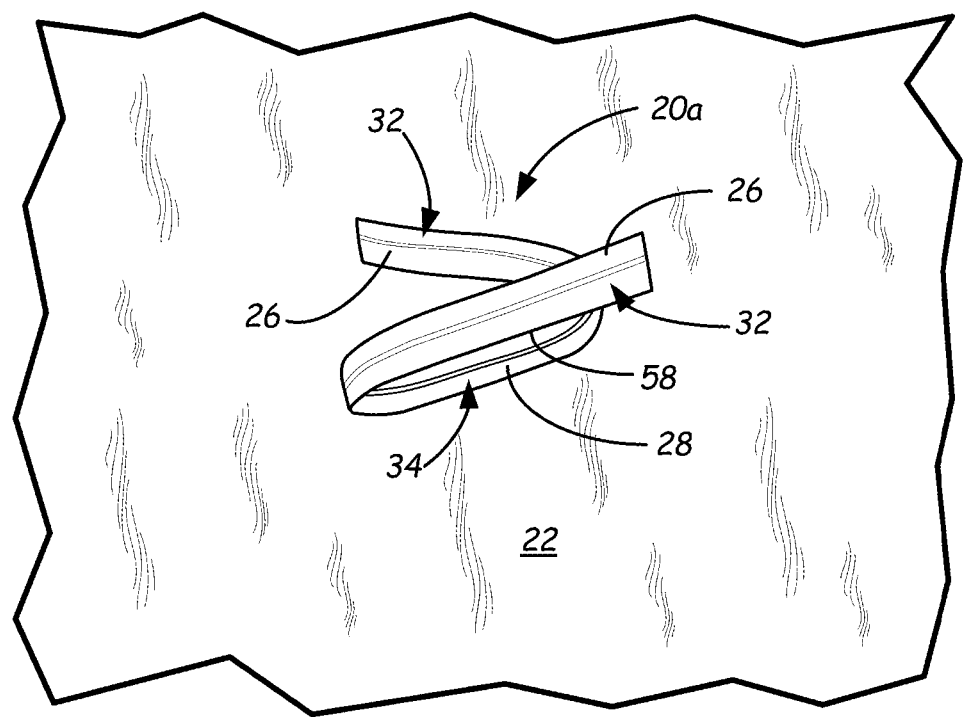
FIG. 4A is a top view of the first exemplary tie article in a bent configuration.
Figure 4B:
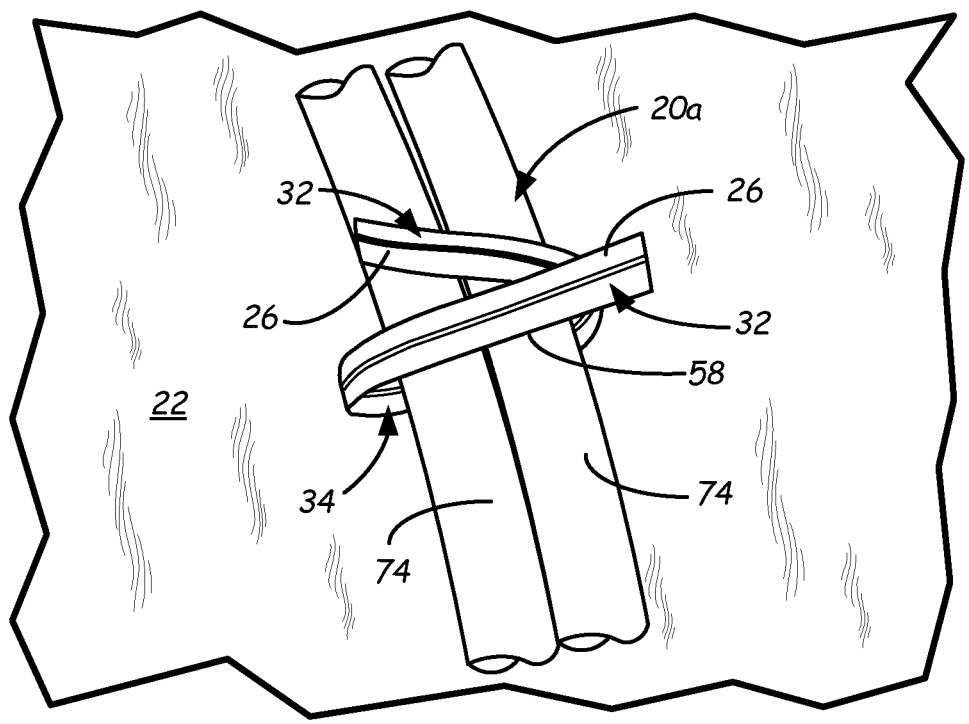
FIG. 4B is similar to FIG. 4A and additionally shows hoses attached to a medical drape by the first exemplary tie article.

FIG. 1 is a top view of a first exemplary embodiment of a tie article 20a secured to a medical drape 22. FIG. 2 is a bottom perspective view of the tie article 20a showing adhesive 24 on central segment 34 of base layer 26. FIG. 3 is an exploded view of the components of tie article 20a, including base layer 26, cover layer 28 and retention wire 30 configured to be sandwiched therebetween. As shown in FIG. 2, arm segments 32 are provided on either side of adhesive 24. As shown in FIGS. 4A and 4B, when tie article 20a is secured by adhesive 24 to drape 22 or another object, arm segments 32 can be bent relative to the central secured portion 34 of tie article 20a, such as in the illustrated manner or in other possible configurations.

Arm segments 32 extend in opposing lateral directions from central segment 34. Arm segments 32 can be manipulated (e.g., bent and/or twisted) to secure tie article 20

(generically referring to articles 20a, 20b, 20c, 20d, and 20e, for example) around items (i.e., "captured" items, not shown) in passageway 58. When adhered to an item such as drape 22, tie article 20 may function as a twist tie or other attachment mechanism to secure item(s) such as hoses 74 to drape 22 or another object to which adhesive portion 24 is adhered. Additionally or alternatively, tie article 20 may be used to bundle captured items (such as hoses 74, for example) together and/or to hold packages or other articles closed. Advantageously, adhesive 24 or another securing means allows tie article 20 to be attached to a drape 22 or other item at a desired location and remain so positioned, even when tie article 20 is in an open (i.e., substantially flat) configuration.

Figure 10:
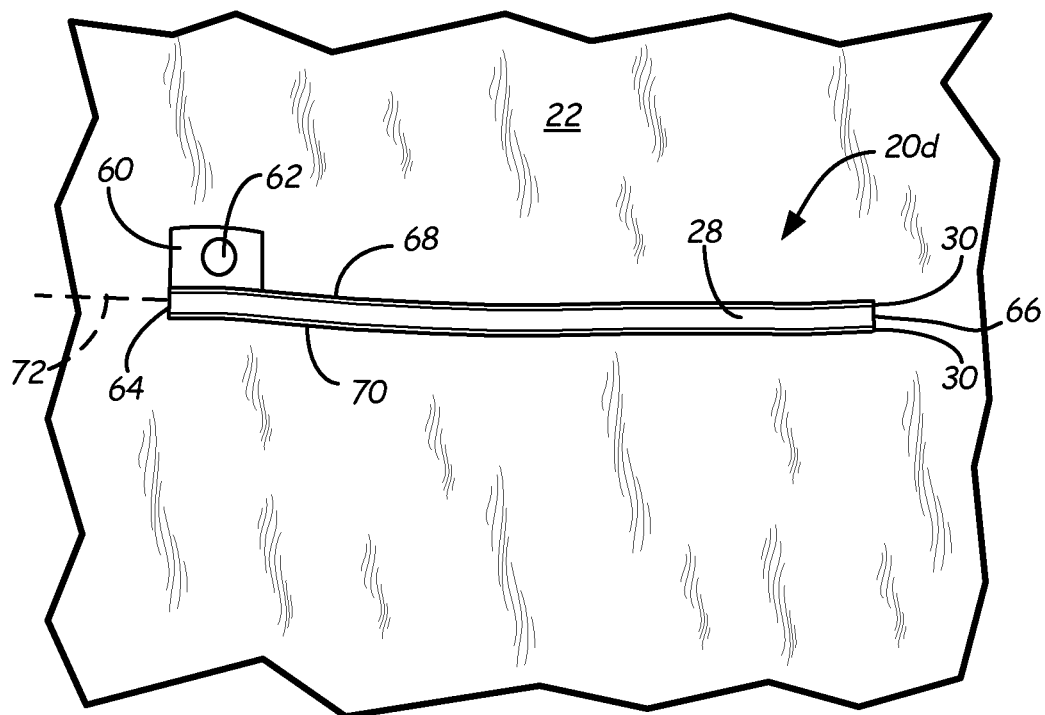
FIG. 10 is a top view of a fourth exemplary embodiment of a tie article.

As shown in FIG. 1, tie article 20 may be provided in a flat, non-bent state (as shown) or in a partially-bent state (e.g., if provided in a roll or spool form). In an exemplary embodiment, tie article is formed as a relatively flat, elongated article having longitudinal edges 68 and 70 and a longitudinal center line 72. In some embodiments, such as shown in FIGS. 1, 6, 8, and 12, tie article 20a, 20b, 20c, or 20e is substantially symmetrical about longitudinal center line 72. In other embodiments, such as shown in FIG. 10, tie article 20d is not symmetrical about longitudinal center line 72 (because flag 60 is offset and attached to only one longitudinal edge 68).

Base layer 26 and cover layer 28 can be made of the same or different sheet materials, such as those including paper, polymers, and textiles, for example. While some discussion refers to separate base and cover layers, it is also contemplated that a tie article can have retention wire 30 encapsulated within a single material, such as an elongated plastic strip.

In one embodiment, base layer 26 is desirably produced from a printable material, such as one or more paper-based materials and/or polymeric materials, such that base layer 26 can present information if desired (e.g., textual, graphical, colored, and/or machine readable information). As discussed below with reference to FIG. 5, when manufacturing tie article 20, base layer 26 is desirably provided as a pre-formed and optionally pre-printed sheet that may be fed into a continuous, in-line process.

Cover layer 28 is desirably produced from a material that exhibits good interlayer bonding to base layer 26. In an exemplary embodiment, cover layer 28 is formed from an optically transparent material that allows any information or other visual presentation on a top surface of base layer 26 (e.g., the surface of base layer 26 facing cover layer 28 in FIG. 3) to be visible through cover layer 28. Information may additionally or alternatively be presented on a bottom surface of base layer 26 (visible in FIG. 2), usually on arms segments 32 rather than co-extensive with adhesive 24. Strong interlayer bonding between cover layer 28 and base layer 26 secures retention wire 30 between base layer 26 and cover layer 28. Such bonding may be achieved by material compatibility, enhanced by heat and other conditions, during manufacturing and/or by the use of adhesives.

The polymeric material of cover layer 28 in an exemplary embodiment also desirably provides durability to tie article 20 and protects base layer 26. For example, in embodiments in which base layer 26 is produced from printable paper, cover layer 28 may structurally reinforce the paper, thereby reducing the risk of tearing tie article 20 during use. Examples of suitable polymeric materials for cover layer 28 include extrudable polymeric materials, such as polyolefins (e.g., low-density polyethylene, high-density polyethylene, and combinations thereof).

Retention wire 30 is a metallic or polymeric wire that desirably provides durable dead-fold properties, as well as high break resistance. As shown in FIGS. 1 and 2, retention wire 30 is generally aligned along longitudinal center line 72 of tie article 20a. In one embodiment, retention wire 30 is formed of steel. However, metal wires ties may be undesirable for use in some applications. For example, when food is commercially packaged for distribution to the public, it is desirable for the packaging to allow inspection of packaged food for contamination by foreign objects. One common method of inspecting food products involves the use of metal detectors to confirm that no metal scrap or shards have inadvertently been incorporated in the food product during production or packaging of the food product. Tie articles with metal retention wires, when attached to food articles, may preclude such use of a metal detector.

Accordingly, in other embodiments, retention wire 30 is a polymeric wire, such as a single component wire or a multiple component wire. Suitable polymeric materials for retention wire 30 include polyethylenes (e.g., high-density polyethylenes), and those disclosed in U.S. Pat. Nos. 6,372,068, 6,673,413 and 7,011,879, which are hereby incorporated by reference to the extent that they are not inconsistent with the present disclosure. In embodiments in which the polymer material is a high-density polyethylene, the high-density polyethylene desirably has a weight-average molecular weight ranging from about 130,000 to about 150,000. The high density polyethylene also desirably has a density of at least about 0.94 grams/cubic-centimeter, as measured pursuant to ASTM D792-08.

In some embodiments, the material of retention wire 30 may also include additional additives, such as colorants, fillers, dead-fold modifiers, biodegradable additives (e.g., oxo-biodegradable additives), toughness modifiers, bond promoters, ultraviolet-stabilizers, and the like. In these embodiments, examples of suitable concentrations of additives in the material range from about 0.01% by weight to about 10% by weight. In one embodiment, suitable concentrations of additives in the material range from about 0.05% by weight to about 5% by weight. The polymeric materials discussed above accordingly constitute the remainder of the material for retention wire 30. While illustrated with a single retention wire 30 in FIGS. 1-7 and two retention wires 30 in FIGS. 8-13, in yet other embodiments, tie article 20 may include other polymeric and/or metallic closure devices, such as clip ties and the like. While exemplary materials for components of tie article 20 are described, it is contemplated that many other sheet and wire materials may also be suitable.

Examples of suitable dimensions for a "wing" thickness of tie article 20 range from about 0.003 inches to about 0.01 inches (i.e., the portions of base layer 26 and cover layer 28 that do not include retention wire 30), where the relative thicknesses of base layer 26 and cover layer 28 may vary depending on the particular materials used for each. For example, in embodiments in which base layer 26 is produced from a stiffer and stronger card material, cover layer 28 may be thinner since base layer 26 requires less structural reinforcement. However, in other embodiments in which base layer 26 is produced from a printable thinner and weaker material (e.g., paper), cover layer 28 is desirably thicker to structurally reinforce base layer 26. At the location of retention wire 30, the thickness of tie article 20 increases to account for the dimensions of retention wire 30. For example, for a retention wire 30 having a diameter or other cross-sectional thickness of about 0.017 inches, examples of suitable thicknesses for tie article 20 at the location of retention wire 30 range from about 0.02 inches to about 0.04 inches.

FIG. 3 illustrates the relative arrangements of base layer 26, cover layer 28, retention wire 30, and optional release liner 56 in an exploded view. In an exemplary method of use, before application of tie article 20 to drape 22 or another item, adhesive 24 may be protected by removable release liner 56. Examples of suitable adhesives 24 include pressure sensitive adhesives (PSAs) (e.g., hot-melt PSAs), such as those based on acrylic monomers and polymers (e.g., bio-based acrylates), block copolymer rubber adhesives, silicone rubber adhesives, and the like, which may optionally include one or more additional tackifying resins. Release liner 56 is configured to release from adhesive 24 so that adhesive 24 remains on base layer 26. In exemplary embodiments, release liner 56 is fabricated from a paper and/or polymeric web (e.g., a polyolefin and/or polyethylene terephthalate web) coated with one or more release agents (e.g., a silicone release coating). In the illustrated embodiment, release liner 56 is shown as a patch that substantially overs only adhesive 24 on base layer 26; however, it is contemplated that release liner 56 may have other configurations. In an exemplary embodiment, adhesive 24 and its corresponding release liner 56 are applied to a back surface of base layer 26, such as on central segment 34 thereof (labeled in FIG. 2). In alternative embodiments, base layer 26 may function as the front side of tie article 20 and cover layer 28 may have adhesive disposed thereon and function as the rear side of tie article 20.

Figure 5:
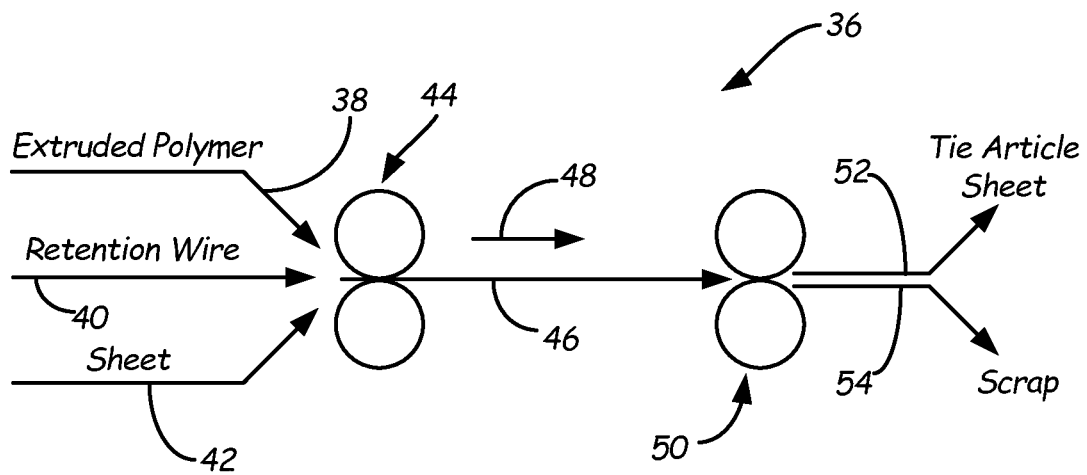
FIG. 5 is a schematic diagram of an in-line process that can be used in the manufacture of exemplary tie articles of the present disclosure.

FIG. 5 is a schematic illustration of an exemplary manufacturing system 36 for fabricating multiple tie articles 20 in a sheet or roll form using a continuous, in-line process. As shown, an exemplary manufacturing system 36 includes extruded polymer inlet line 38, wire inlet line 40, and sheet inlet line 42. Extruded polymer inlet line 38 is an extrusion line configured to melt and extrude the polymeric material for cover layer 28. Wire inlet line 40 is configured to relay one or more continuous strands of retention wire 30 (or other closure device) from a supply source (e.g., spool of retention wire(s) 30 or manufacturing lines for retention wire(s) 30). Finally, sheet inlet line 42 is configured to supply a sheet material for base layer 26.

Polymer inlet line 38, wire inlet line 40, and sheet inlet line 42 desirably converge at nip rollers 44, which may compress and cool the received materials to produce a continuous web 46 of the laminated layers. Web 46 moves in the direction of arrow 48 and is cut at die cutter 50 into multiple separable tie articles 20. For example, die cutter 50 may partially cut and/or perforate web 46, allowing web 46 to maintain a continuous sheet of multiple, separable tie articles 20 that can exit manufacturing system 36 via exit line 52. Resulting scrap pieces, if any, may drop out of manufacturing system 36 via scrap line 54, where the scrap pieces may then be collected and recycled. The resulting continuous sheet of multiple tie articles 20 from exit line 52 may then be stacked, folded, rolled into a spool form, or otherwise made available for subsequent consumer use. In an alternative embodiment, the sheet entering via sheet inlet line 42 may be pre-cut (e.g., die cut) prior to reaching nip rollers 44. Additional details of a suitable manufacturing method and alternative constructions are described in International Patent Application Publication No. WO 2016/061515 by Bedford Industries, Inc. for "Perforated Bib Tie Articles and Methods of Manufacture and Use," which is hereby incorporated by reference.

Figure 6:
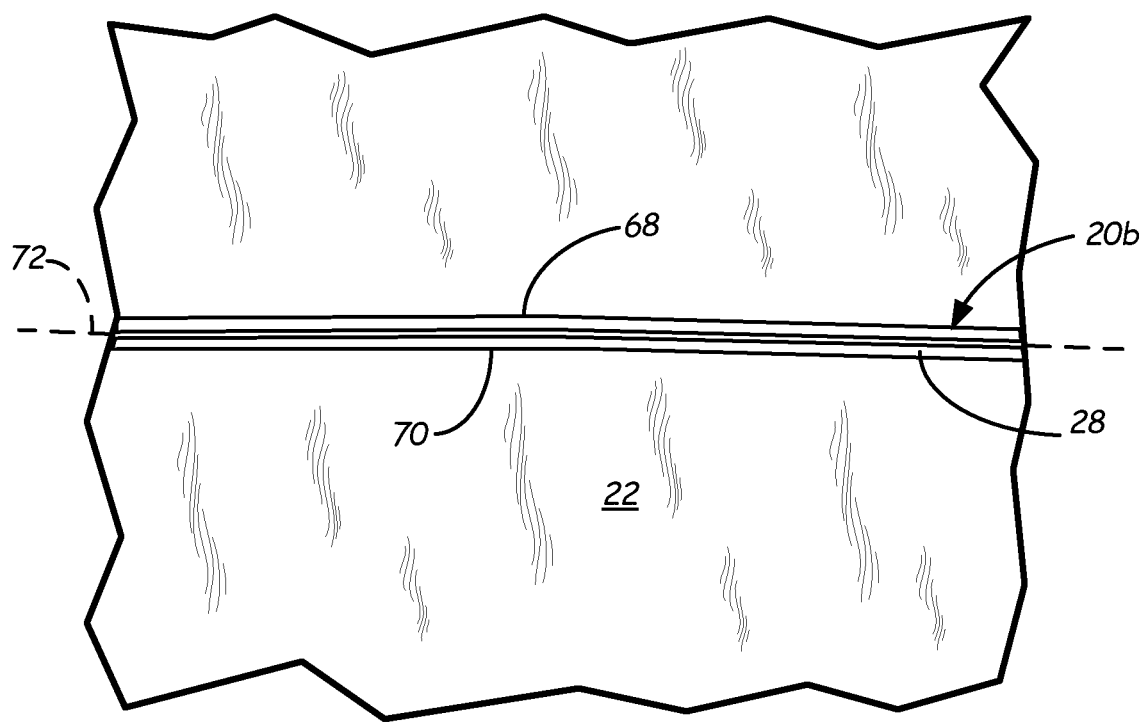
FIG. 6 is a top view of a second exemplary embodiment of a tie article.
Figure 7:
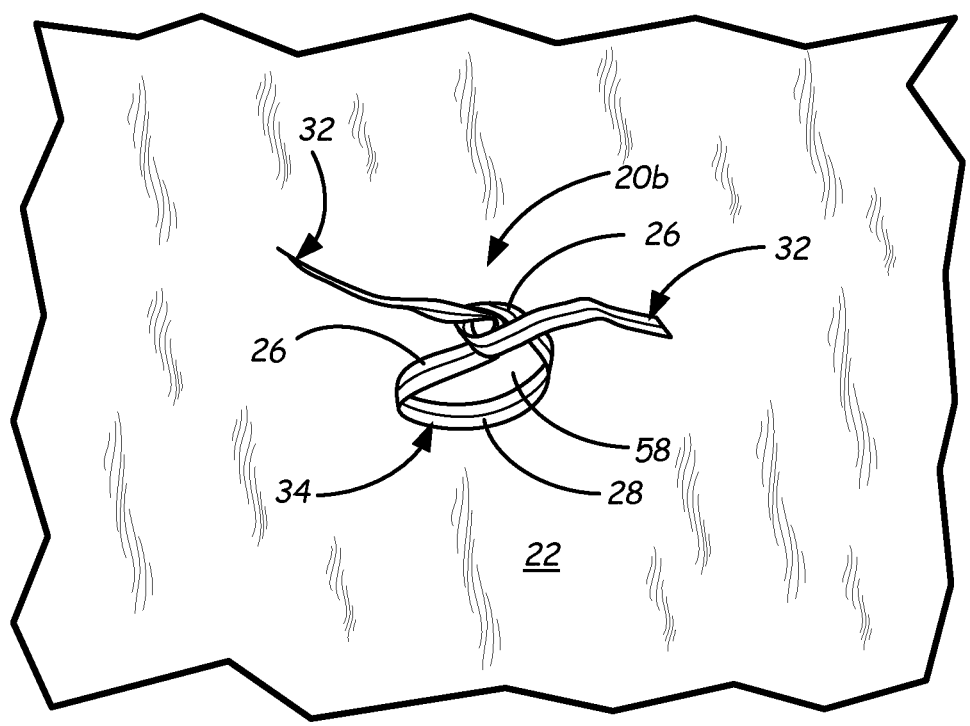
FIG. 7 is a top perspective view of the second exemplary tie article in a twisted configuration.

FIG. 6 is a top view of a second exemplary embodiment of a tie article 20b. FIG. 7 is a top perspective view of the tie article 20b in a twisted configuration. As compared to tie article 20a, tie article 20b has a relatively narrower and longer configuration. Accordingly, it is more suited to a method of use in which arm segments 32 are twisted about each other to form a passage 58 in which items such as hoses 74 may be positioned to be secured by arm segments 32 onto drape 22.

Figure 8:
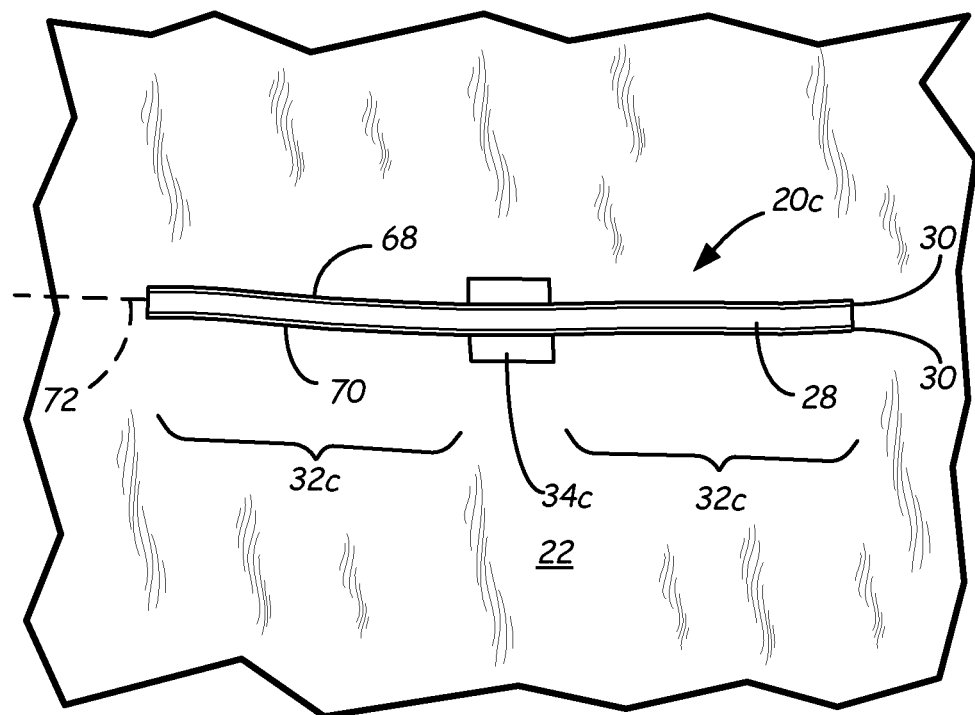
FIG. 8 is a top view of a third exemplary embodiment of a tie article.
Figure 9:
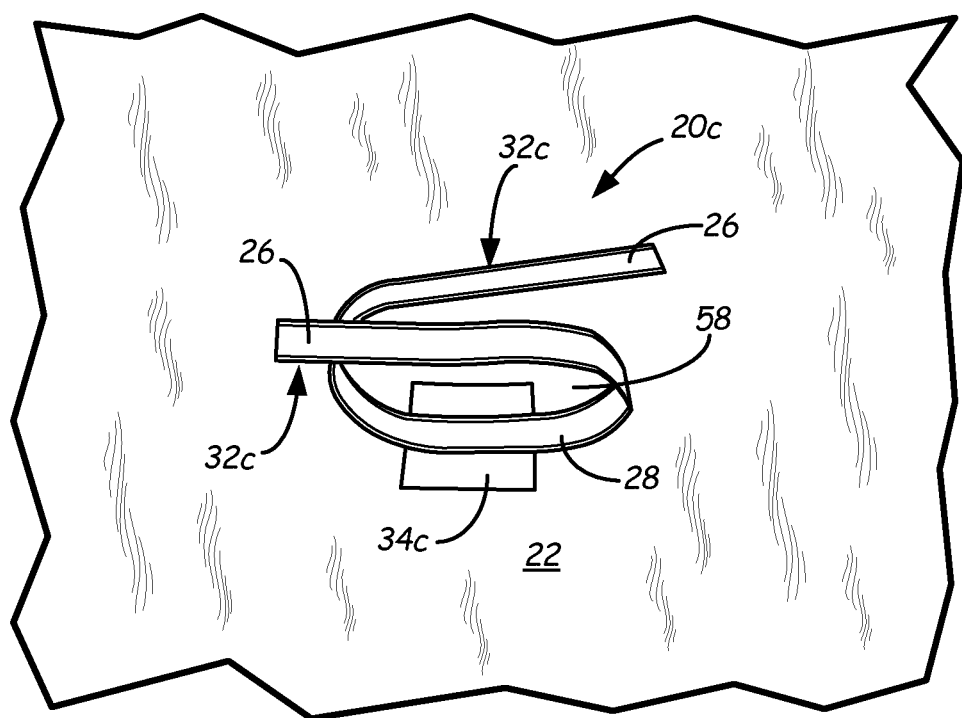
FIG. 9 is a top perspective view of the third exemplary tie article in a bent configuration.

FIG. 8 is a top view of a third exemplary embodiment of a tie article 20c. FIG. 9 is a top perspective view of tie article 20c in a bent configuration. In an exemplary embodiment, tie article 20c has two retention wires 30 sandwiched between base layer 26 and cover layer 28, the two retention wires 30 being spaced apart and positioned along the longitudinal edges 68, 70 of tie article 20c. Further, tie article 20c has an extended central segment 34c formed as an enlarged area of either or both of base layer 26 and cover layer 28. Central segment 34c provides a larger surface area, as compared to central segment 34 of tie articles 20a and 20b, for the disposition of adhesive 24. Moreover, a top surface of central segment 34c offers a larger surface area on which a user may press down upon adhesive 24 against drape 22. Additionally, the extended central segment 34c offers a clear visual indication of the location of adhesive 24 on a lower surface thereof. While central segment 34c is illustrated as a generally rectangular element, it is contemplated that many other shapes are also suitable. While tie article 20c illustrates the use of two retention wires 30, it is contemplated that a configuration of a tie article having fewer or more retention wires or other retention mechanisms can also be used.

Figure 11:
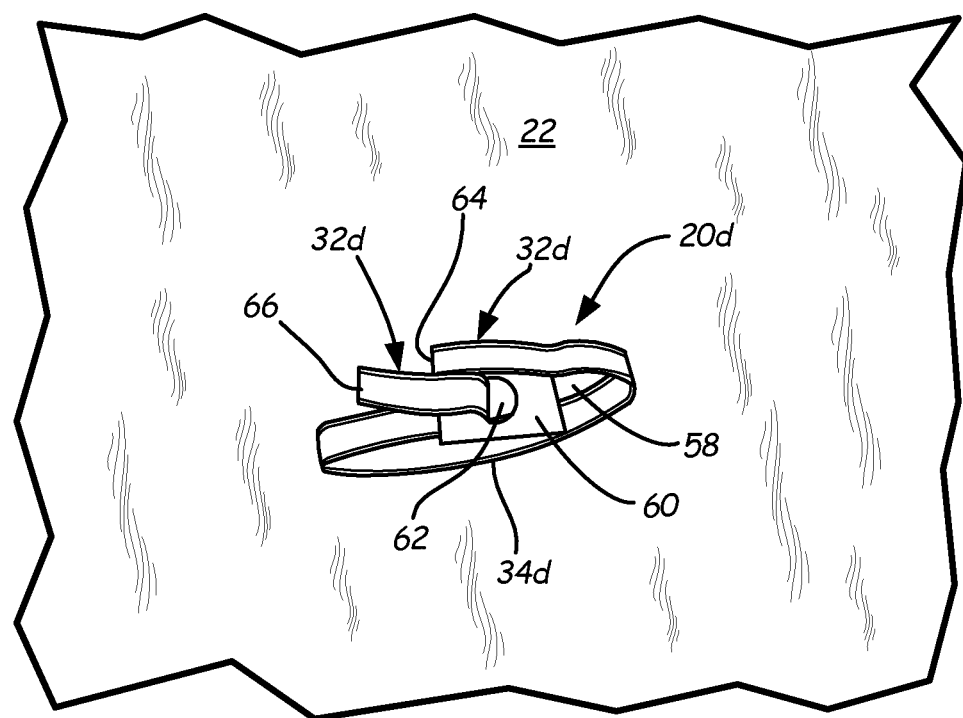
FIG. 11 is a top perspective view of the fourth exemplary tie article in a closed configuration.

FIG. 10 is a top view of a fourth exemplary embodiment of a tie article 20d. FIG. 11 is a top perspective view of tie article 20d in a closed configuration. Tie article 20d includes flag 60 having aperture 62 therethrough at first end 64 of tie article 20d opposite second end 66. In one method of closing tie article 20d, arm segments 32d are bent upward from central segment 34d. End 66 is inserted through aperture 62 and folded back itself to secure tie article tie article 20d in a closed position having passage way 58 therethrough.

While aperture 62 is illustrated as circular, it is contemplated that an aperture through flag 60 can have any of a variety of closed shapes, including regular and irregular polygons and holes having outlines with segments that are curved, straight, and combinations thereof. Moreover, while flag 60 is illustrated as having a generally rectangular shape, flag 60 could alternatively have any of a number of different shapes and positional placements. In an exemplary embodiment, flag 60 is formed as an extension of either or both of base layer 26 and cover layer 28.

Figure 12:
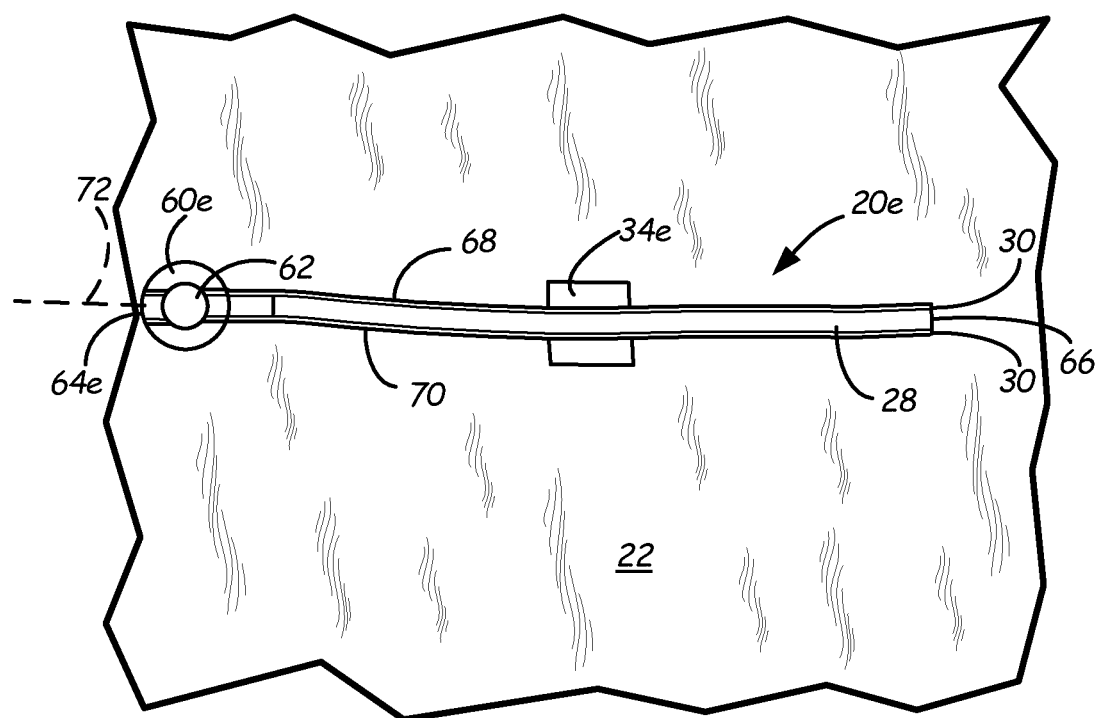
FIG. 12 is a top view of fifth exemplary embodiment of a tie article.
Figure 13:
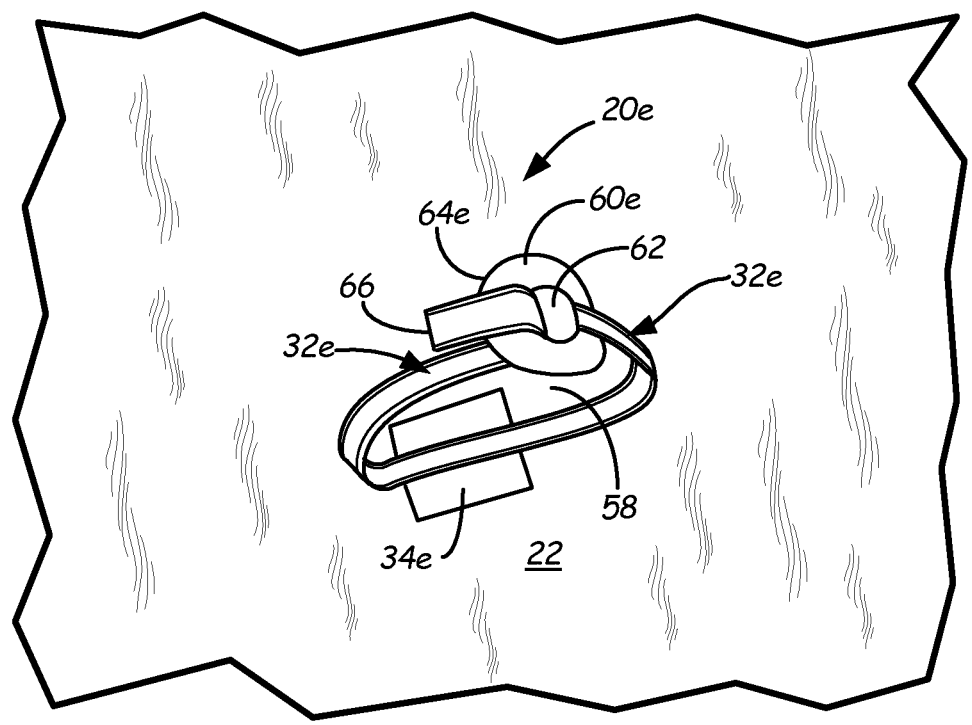
FIG. 13 is a top perspective view of the fifth exemplary tie article in a closed configuration.

FIG. 12 illustrates a fifth exemplary embodiment of a tie article 20e, wherein flag 60e has a circular shape positioned along longitudinal center line 72. FIG. 13 is a top perspective view of tie article 20e in a closed configuration, achieved in a manner similar to that described with respect to tie article 20d in FIG. 11, above.

The particularly illustrated uses show, in FIGS. 4 and 9, tie article 20a, 20c in a closed, bent, sometimes overlapping configuration; tie article 20b in FIG. 7 in a closed, twisted configuration; and tie article 20d, 20e in FIGS. 11 and 13 in a closed, cinched, folded-over configuration. However, it is to be understood that the tie articles 20 of the present disclosure can be manipulated in manners other than specified.

Tie article 20 allows for ease of application to an object such as drape 22. Further, tie article 20 allows for easy capture of items (e.g., hoses and cables 74) in passageway 58 and removal of the bundled products therefrom, which is important because some surgical procedures require the hoses 74 to be moved and re-secured several times during one use of drape 22. Tie article 20 is desirably formed as a unitary piece, which is easier for a user to handle as compared to a two (or multiple) piece assembly that requires the user to precisely align cooperating pieces on drape 22 in order for the features to work properly.

Exemplary, non-limiting features of the disclosed tie articles and uses and manufacturing thereof are described herein. In an exemplary embodiment, a tie article 20 has a substantially elongated configuration having opposed first and second longitudinal edges 68, 70. The tie article 20 includes a base layer 26 including a central segment 34 and two arm segments 32, each of the arm segments 32 extending from opposing sides of the central segment 34. A cover layer 28 overlaps the base layer 26. A closure device 30 is sandwiched between the base layer 26 and the cover layer 28 so that the base layer 26 and cover layer 28 are bonded together around the closure device 30. An adhesive 24 is disposed on the central segment 34 of the base layer 26. An extension 34c, 34e, 60, 60e of either or both of the base layer 26 and cover layer 28 extends beyond at least one of the first and second longitudinal edges 68, 70. In an exemplary embodiment, the closure device 30 includes a wire. In some embodiments, the extension 34c, 34e is located at the central segment 34. In other embodiments, the extension 60, 60e is located proximate an end 64, 64e of one of the arm segments 32. In some embodiments, the extension 60, 60e includes an aperture 62.

In some embodiments, tie article 20a, 20b, 20c, 20e is substantially symmetrical about the longitudinal center line 72. In another embodiment, tie article 20d is asymmetrical about the longitudinal center line 72. In some embodiments, tie article 20 further includes a release liner 56 positioned adjacent the adhesive 34. In some embodiments, the closure device 30 exhibits dead-fold properties.

A method for attaching a second item 74 to a first item 22, includes providing a tie article 20 having a substantially elongated configuration having opposed first and second longitudinal edges 68, 70. The method includes pressing an adhesive 24 of the tie article 20 onto the first item 22 to attach the tie article 20 to the first item 22. The method further includes bending two arm segments 32 of the tie article 20 around the second item 74. As shown in FIG. 7, some methods including twisting the two arm segments 32 together.

As shown in FIGS. 10-13, in some cases the tie article 20d, 20e includes an extension 60, 60e of either or both of the base layer 26 and cover layer 28 beyond at least one of the first and second longitudinal edges 68, 70, the extension 60, 60e including an aperture 62. The method includes inserting an end 66 of the one of the arm segments 32 through the aperture 62. In some embodiments, the method further includes bending the one of the arm segments 32 after inserting the end 66 through the aperture 62. In some embodiments, the method further includes removing a release liner 56 from the adhesive 24 before pressing the adhesive 24 onto the first item 22.

A process for manufacturing a plurality of tie articles 20 includes feeding a first web of a first material in a first direction 48 at sheet inlet line 42; feeding a wire 30 adjacent the first web in the first direction 48 at wire inlet line 40; and feeding a second web of a second material in the first direction 48 at polymer inlet line 38. The first web for forming base layer 26 and the second web for forming cover layer 28 encase the fed first wire 30, as shown in FIGS. 2 and 3. The process includes laminating the first web and the second web with the first wire 30 therebetween to form a tie article web 46; applying adhesive 24 to a portion of the tie article web 46; and partially cutting the tie article web 46 to form a plurality of connected tie articles 20. In some embodiments, the process further includes extruding a polymer to form the second web. In some embodiments, the laminating is accomplished by one or more nip rollers 44. In some embodiments, the process further includes printing the first web. In some embodiments, the process includes cutting the wire 30 between adjacent tie articles 20 by a cutter 50. In some embodiments, the tie article web includes a scrap portion between two adjacent tie articles 20, the process further including removing the scrap portion from the tie article web, such as via scrap line 54.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa.

The invention claimed is:

1. A tie article having a substantially elongated configuration having opposed first and second longitudinal edges, the tie article including:
    a base layer including a central segment and two arm segments, each of the arm segments extending from opposing sides of the central segment;
    a closure device contacting and attached to the base layer;
    a pressure-sensitive adhesive disposed on the central segment of the base layer; and
    a first extension of the base layer that extends beyond at least one of the first and second longitudinal edges, wherein the first extension is located proximate an end of one of the arm segments and includes an aperture.

2. The tie article of claim 1 wherein the closure device includes a wire.

3. The tie article of claim 1 further including a second extension of the base layer that extends beyond at least one of the first and second longitudinal edges, the second extension being located at the central segment.

4. The tie article of claim 1 having a longitudinal center line, and wherein the tie article is substantially symmetrical about the longitudinal center line.

5. The tie article of claim 1 having a longitudinal center line, and wherein the tie article is asymmetrical about the longitudinal center line.

6. The tie article of claim 1 and further including a release liner positioned adjacent the adhesive.

7. The tie article of claim 1, wherein the closure device exhibits dead-fold properties.

8. A method of using the tie article of claim 1 for attaching a second item to a first item, the method including:
    pressing the adhesive onto the first item to attach the tie article to the first item;
    bending the two arm segments around the second item; and
    inserting an end of the one of the aim segments through the aperture.

9. The method of claim 8 further including twisting the two arm segments together.

10. The method of claim 8 further including bending the one of the aim segments after inserting the end through the aperture.

11. The method of claim 8 and further including removing a release liner from the adhesive before pressing the adhesive onto the first item.

12. The tie article of claim 1 further including a cover layer overlapping the base layer.

13. The tie article of claim 12 wherein the closure device is sandwiched between the base layer and the cover layer so that the base layer and cover layer are bonded together around the closure device.

14. The tie article of claim 12 wherein the cover layer includes an optically transparent material.

15. The tie article of claim 12 wherein the first extension includes a portion of the cover layer that extends beyond at least one of the first and second longitudinal edges.

16. The tie article of claim 1 wherein the base layer includes printed information.

17. The tie article of claim 2 wherein the wire includes a polymeric material.

18. The tie article of claim 1 wherein the closure device includes two substantially parallel wires disposed along the first and second longitudinal edges.

19. The tie article of claim 3 wherein the second extension includes a portion of a cover layer that extends beyond at least one of the first and second longitudinal edges.

20. The tie article of claim 1 wherein the first extension is circular.

\* \* \* \* \*